(12) United States Patent
Okabe et al.

(10) Patent No.: US 10,032,534 B2
(45) Date of Patent: Jul. 24, 2018

(54) METHOD FOR PROCESSING RADIOACTIVE LIQUID WASTE

(71) Applicant: KABUSHIKI KAISHA TOSHIBA, Minato-ku (JP)

(72) Inventors: Hirofumi Okabe, Kawasaki (JP); Masaaki Kaneko, Yokohama (JP); Tatsuaki Sato, Kawasaki (JP); Tetsuo Motohashi, Ota (JP); Toshiaki Sugimori, Shinagawa (JP); Rie Arai, Ebina (JP); Yohei Sato, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 173 days.

(21) Appl. No.: 15/059,709

(22) Filed: Mar. 3, 2016

(65) Prior Publication Data
US 2016/0276049 A1    Sep. 22, 2016

(30) Foreign Application Priority Data

Mar. 16, 2015 (JP) .................................. 2015-052378

(51) Int. Cl.
G21F 9/16 (2006.01)
C04B 28/04 (2006.01)
(Continued)

(52) U.S. Cl.
CPC ............. *G21F 9/165* (2013.01); *C04B 28/04* (2013.01); *C04B 40/0039* (2013.01); *G21F 9/06* (2013.01);
(Continued)

(58) Field of Classification Search
None
See application file for complete search history.

(56) References Cited

U.S. PATENT DOCUMENTS

| 4,800,042 A | 1/1989 | Kurumada et al. |
| 5,998,690 A | 12/1999 | Huang et al. |
| 6,448,461 B1 * | 9/2002 | Toyohara ............ G21F 9/16 588/12 |

FOREIGN PATENT DOCUMENTS

| JP | 52076600 | * 12/1975 |
| JP | 61089593 | * 10/1984 |

(Continued)

OTHER PUBLICATIONS

English Abstract of JP 61089593 (1986).*

(Continued)

*Primary Examiner* — Sheng H Davis
(74) *Attorney, Agent, or Firm* — Oblon, McClelland, Maier & Neustadt, L.L.P.

(57) ABSTRACT

A method for processing a radioactive liquid waste containing boron of the present invention includes: a molar ratio control step of adding an alkali metal or an alkali metal compound to a radioactive liquid waste containing boron to control an alkali metal/boron molar ratio in the radioactive liquid waste to be 0.8 or more; a drying step of drying the radioactive liquid waste having the controlled molar-ratio using a dryer to form a powdered waste; a dissolving step of mixing the powdered waste with kneading water to prepare a solution; and a kneading step of adding a hydraulic inorganic solidifying material to the solution, and kneading the hydraulic inorganic solidifying material and the solution for solidification.

7 Claims, 3 Drawing Sheets

(51) Int. Cl.
*G21F 9/06* (2006.01)
*C04B 40/00* (2006.01)
*G21F 9/08* (2006.01)
*C04B 111/00* (2006.01)

(52) U.S. Cl.
CPC ............... *G21F 9/08* (2013.01); *G21F 9/162* (2013.01); *C04B 2111/00767* (2013.01)

(56) References Cited

FOREIGN PATENT DOCUMENTS

| | | |
|---|---:|---|
| JP | 2-208600 | 8/1990 |
| JP | 10-90490 | 4/1998 |
| JP | 2001-97757 | 4/2001 |
| JP | 2010-2378 | 1/2010 |
| JP | 2010-151487 A | 7/2010 |
| JP | 2014-106144 A | 6/2014 |

OTHER PUBLICATIONS

English Translation of Mitsubishi JP 61089593 (1986).*
Extended European Search Report dated Aug. 22, 2016 in Patent Application No. 16158664.9.

* cited by examiner

METHOD FOR PROCESSING RADIOACTIVE LIQUID WASTE

CROSS-REFERENCE TO RELATED APPLICATION

This application is based upon and claims the benefit of priority from Japanese Patent application No. 2015-52378, filed on Mar. 16, 2015, the entire content of which is incorporated herein by reference.

BACKGROUND

Technical Field

Embodiments describe herein relate to a method for processing a radioactive liquid waste containing boron.

Description of the Related Art

The common method for processing a liquid waste containing boron compound as the main component produced in a nuclear power plant such as pressurized water reactor is carried out by neutralizing the liquid waste using sodium hydroxide and subsequently solidifying mainly with a cement or asphalt.

However, the asphalt involves a fire hazard when heated and poor chemical adsorption of the radionuclide. For this reason, the cement solidification is the mainstream method in new plants.

In the cement solidification, however, the presence of boron and boron compounds retards a setting and hardening reaction of cement and consequently causes a notable hindrance in hardening and deteriorated strength. To deal with these issues, various techniques have been studied such as the solidification with the addition of a calcium hydroxide, or the like, to be a pretreatment agent from the perspective of solidifying a boric acid liquid waste with a cement while enhancing the volume reduction of the waste.

Patent Document 1 (Japanese Patent Laid-Open No. 10-90490), for example, discloses a method wherein a boric acid-containing liquid waste (sodium borate solution) is heated and concentrated at 90° C. or more, cooled to 60° C. or less to allow sodium borate to precipitate, subsequently a blast-furnace cement is added and kneaded, and the obtained kneaded mixture is discharged to a 200 L drum.

Patent Document 2 (Japanese Patent Laid-Open No. 11-72593) discloses a method wherein boric acid or a borate solution is adjusted to pH 7 to 10, mixed with a powder such as a divalent or higher valent metal oxide, hydroxide, salt, cement, or slug to form a slurry, and the slurry is adjusted to have a water content of 40% or less and hardened.

Patent Document 3 (Japanese Patent Laid-Open No. 2-208600) proposes a method wherein a calcium hydroxide is added to a boric acid liquid waste to form a dry powder, which is subsequently solidified by compaction or with a resin.

Patent Document 4 (Japanese Patent Laid-Open No. 2010-2378) proposes a method comprising boric acid insolubilization, which includes a first step of controlling a boric acid-containing liquid waste by adding an alkali metal element compound and a second step wherein a temperature is subsequently increased to a predetermined temperature of 85° C. or higher and an alkali earth metal compound is added thereto and stirred, and drying the treated liquid waste to obtain a powdered waste, which is then cement solidified.

Patent Document 5 (Japanese Patent Laid-Open No. 2001-97757) proposes a method for cement-solidifying a dry-powdered boric acid liquid waste, wherein a boric acid liquid waste is dried without pretreatment such as insolubilization, and the produced dry-powder is solidified with cement by adding a sodium aluminate to be a cement hardening promoter and lithium hydroxide to be an aid.

When a solidifying material such as a cement or slug is added to and mixed with a solution of boric acid liquid waste concentrated to supersaturation as in the conventional techniques described above, sodium borate absorbs water and forms a hydrate whereby the plasticity is lost very quickly to cause false setting. Consequently, sufficient hydration reaction between a solidifying material such as a cement and water is prevented and a strength of the obtained solidified product is deteriorated.

SUMMARY

Embodiments of the present invention have been implemented in view of the above circumstances and have an object to provide a method for processing a radioactive liquid waste capable of processing a radioactive liquid waste containing boron into a solidified product with a long-term high strength and also achieving volume reduction of the waste highly.

A method for processing a radioactive liquid waste containing boron according to an embodiment of the present invention includes; a molar ratio control step of adding an alkali metal or an alkali metal compound to a radioactive liquid waste containing boron to control an alkali metal/boron molar ratio in the radioactive liquid waste to be 0.8 or more; a drying step of drying the radioactive liquid waste having the controlled molar-ratio using a dryer to form a powdered waste; a dissolving step of mixing the powdered waste with kneading water to prepare a solution; a kneading step of adding a hydraulic inorganic solidifying material to the solution, and kneading the hydraulic inorganic solidifying material and the solution for solidification.

DETAILED DESCRIPTION

The present embodiments are described hereinafter with reference to the accompanying drawings. The embodiments of the present invention provide a method for processing a radioactive liquid waste capable of processing a radioactive liquid waste containing boron into a solidified product with a long-term high strength and also achieving volume reduction of the waste highly.

First Embodiment

Figure 1:
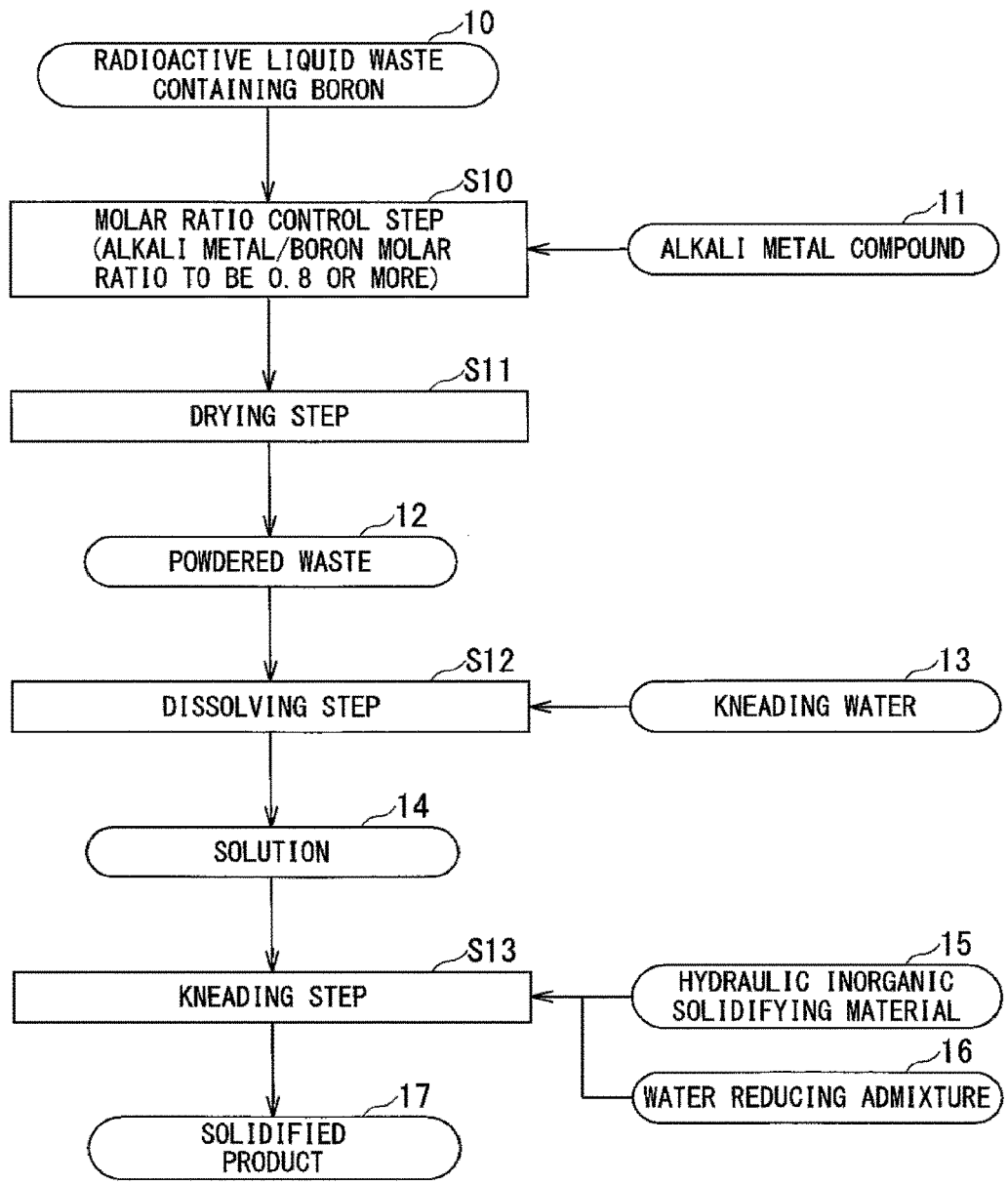
FIG. 1 is a flow chart showing the method for processing a radioactive liquid waste according to a first embodiment.

As shown in the process flow chart of FIG. 1, the method for processing a radioactive liquid waste 10 according to the first embodiment comprises a molar ratio control step S10 of adding an alkali metal or an alkali metal compound 11 to the radioactive liquid waste 10 containing boron to control an alkali metal/boron molar ratio in the radioactive liquid waste to be 0.8 or more, a drying step S11 of drying the radioactive liquid waste 10 having the controlled molar-ratio using a dryer to form a powdered waste 12, a dissolving step S12 of mixing the powdered waste 12 with kneading water 13 to prepare a solution 14, and a kneading step S13 of adding a hydraulic inorganic solidifying material 15 to the solution 14, and kneading the solution 14 and the hydraulic inorganic solidifying material 15 for solidification. In the present embodiments, the subject to be treated is the radioactive liquid waste 10 containing boron as the main component used to regulate reactor output, or the like, at a pressurized water reactor.

In the molar ratio control step S10, the radioactive liquid waste 10 is injected into a holding vessel and the alkali metal compound 11 is added to the liquid waste. An amount of the alkali metal compound 11 to be added is then controlled so that an alkali metal/boron molar ratio in the total molar quantity of the liquid waste is 0.8 or more.

Examples of the alkali metal compound 11 include lithium hydroxide, sodium hydroxide, potassium hydroxide, cesium hydroxide, rubidium hydroxide, sodium aluminate, lithium aluminate, potassium aluminate, cesium aluminate, and rubidium aluminate. Alternatively, a mixture of these compounds is also used. The alkali metal compound 11 is preferably a hydroxide because a solution is easily shifted to alkaline.

In place of or in combination with the alkali metal compound 11, an alkali metal element is added. Any of sodium, potassium, lithium, rubidium, and cesium is used as the alkali metal element. Alternatively, a mixture of these elements is also used.

The borate (sodium borate) in the radioactive liquid waste 10 is in different ion forms depending on the solution pH. Multiple ion forms ($B_3O_3(OH)_4^-$, $B_4O_5(OH)_4^{2-}$, $B_3O_3(OH)_5^{2-}$, etc.) are present randomly from a neutral range to a weakly alkaline range. The borate, however, converts to a single ion form ($B(OH)_4^-$) on a strong alkaline side (pH 12 or more).

When different ion forms are mixed in the solution, each ion becomes liable to be polymerized (polymerization reaction), whereas ions are hardly polymerized in the case of single ion form.

Controlling an amount of the alkali metal compound 11 to be added to attain an alkali metal/boron molar ratio of 0.8 or more allows the pH of the radioactive liquid waste 10 to shift to the alkaline side. When the pH of the radioactive liquid waste 10 is caused to shift to the alkaline side in this manner, the borate in the radioactive liquid waste 10 always stays in a single ion form and the ion polymerization is thus inhibited. The radioactive liquid waste 10 is kept stable in the form of liquid by attaining an alkali metal/boron molar ratio to be 0.8 or more Therefore, the increase in the viscosity of the liquid waste by the polymerization reaction with passage of time is suppressed. In addition, the radioactive liquid waste 10 is kept stable without constant heat treatment which is needed if the solubility of the liquid waste is low.

When the polymerization is inhibited, the radioactive liquid waste 10 never changes to semi-solid or solid and is consequently made easy to handle in the subsequent drying step S11. Similarly, the waste 10 is made easy to handle in the dissolving step S12 and the kneading step S13 where the dissolved product of the powdered waste 12 produced in the drying step S11 is handled.

The alkali metal compound 11 added to the radioactive liquid waste 10 dissolves in water unlike insoluble components such as calcium hydroxide. For this reason, the holding vessel, pipes, and the dryer to be used in the subsequent processes are easily washed. Consequently, no special after-treatment such as equipment replacement is required and the liquid waste treatment process is operated in stability.

The larger an amount of the alkali metal compound 11 added, the higher an alkali metal/boron molar ratio is set. This is desirable from the perspectives of causing the pH of the radioactive liquid waste 10 to shift to alkaline, easy handling of the waste in the subsequent steps, and acquiring a high strength of the solidified product 17 as the final product. Conversely, an increased amount of the alkali metal compound 11 accordingly results in an increased amount of the waste. Thus, the alkali metal/boron molar ratio is preferably set in a range from about 0.8 to about 5.

In the drying step S11, the radioactive liquid waste 10 having the controlled molar-ratio is dried in a dryer (not shown in Figures) to form the powdered waste 12. Solidifying the powdered waste 12 by drying the radioactive liquid waste 10 reduces a volume of the radioactive liquid waste 10.

The concentrated liquid waste forms precipitation when cooled and consequently causes fixation and blockage. Accordingly, pipes and tanks must be always heated and kept warm. Furthermore, it is difficult to regulate the concentration of liquid waste when additional concentration is carried out. Powdering the radioactive liquid waste in the drying step S11 achieves easy measurement management and handling when compared with the case of the concentrated liquid waste.

A dryer commonly used in plants is used for the drying treatment but a wiped film dryer is preferable when considering thermal efficiency and particle size stability. A vertical thin film dryer, shelf type dryer, media fluidized dryer, fluidized bed dryer, air spray dryer, and vacuum dryer may be used as the dryer used in the drying step S11. In the view of a throughput and preventing vapor water containing radioactive materials from transferring into an extraction steam system in the dryer when heated, a vertical the thin film dryer is preferably used. A wiped film dryer offers benefits of providing a high thermal efficiency, downsizing apparatus and allowing a small amount of the powder to shift to the gas phase portion while drying.

In the drying step S11, a temperature for drying the radioactive liquid waste 10 is desirably more than 140° C. to powder the radioactive liquid waste 10 uniformly.

When the conditions for drying treatment are not suitable, insufficient drying is caused and a slurry remains in the dried product produced in the drying step S11, or many large-sized dried products are formed. When insufficient drying occurs, a motor load of the dryer is increased, insufficiently dried products accumulate at an outlet, and the like, likely causing the continuous drying treatment to be difficult. A temperature for drying treatment set to be more than 140° C. inhibits the incidence of the slurry and lumps by insufficient drying. Thus, the entire radioactive liquid waste 10 is uniformly powdered without containing a slurry. The slurry herein means part of the radioactive liquid waste 10 having a viscosity because of water existence even after drying treatment.

The radioactive liquid waste 10 is more uniformly powdered when an Na/B ratio in the molar ratio control step S10 is controlled to be a value of 0.9 or higher and dried at more than 140° C. in the drying step S11.

The radioactive liquid waste 10 having an alkali metal/boron molar ratio of 0.8 or more may be solidified by directly drying in the drying step S11 without being subjected to the molar ratio control step S10.

In the dissolving step S12, the powdered waste 12 obtained in the drying step S11 is mixed with and dissolved in kneading water 13 retained in the holding vessel to prepare the solution 14.

The main component of powdered waste 12 is borate. In the typical mixing procedure, that is when the powdered waste 12 is directly fed to a cement paste (a slurry obtained by mixing a hydraulic inorganic solidifying material 15 and the kneading water 13), sodium borate absorbs water to form a hydrate. The heat of hydration generated by the powdered waste 12 increases a temperature of the cement kneaded mixture and accordingly a viscosity to the cement kneaded mixture is extremely increased, likely causing insufficient kneading or false setting.

Thus, when the powdered waste 12 is first mixed with and dissolved in the kneading water 13 to produce a hydrate salt in advance, the increase in temperature, insufficient kneading of the cement kneaded mixture, and false setting of the cement are reduced. The time for dissolving the powdered waste 12 in the kneading water 13 first is desirably 10 minutes or more when considering the time required for a hydrate salt of borate is produced.

In the kneading step S13, the hydraulic inorganic solidifying material (cement) 15 is added to the holding vessel in which the solution 14 is retained and the solution 14 and the hydraulic inorganic solidifying material 15 are kneaded for solidification. When a cylindrical solidification vessel such as an oil drum is used to be the holding vessel, a satisfactory solidified product is achieved.

The hydraulic inorganic solidifying material 15 may be various commonly used cements but Portland cement with a large Ca content in the solidifying material is desirably used. During the cement solidification, the Ca in the cement binds borate contained in the solution likely to reduce the Ca content which is supposed to contribute to the cement solidification. For this reason, use of Portland cement blocks the Ca content deficiency. Examples of the hydraulic inorganic solidifying material 15 include caustic lime, blast-furnace slug cement, fly ash, siliceous material, pozzolanic material, alumina cement, phosphoric acid cement, or a combination thereof.

The alkali metal/boron molar ratio is controlled in the molar ratio control step S10 to cause the solution 14 to be alkaline. When the pH is alkaline, the reaction between the borate ion contained in the solution 14 and the calcium in a cement is suppressed. Consequently, the inhibition effect caused by boron on the cement solidification is prevented and the solidified product 17 with a high strength is produced.

The excess water of the solidified product 17 and the pH of water with the solidified product 17 immersed therein are alkaline, which is desirable for disposal.

A pH value of the leachate from the solidified product, in terms of a radioactive waste disposal site, is desirably 12 or higher. Thus, an alkali aggregate is kneaded together as necessary in the kneading step S13. An applicable alkali aggregate is crushed pieces of a hardened cement or granular slaked lime. A particle size is desirably 2.5 mm or less as in the typical fine aggregates.

An enhanced plasticity of the kneaded mixture advantageously allows a larger amount of the waste to be fed, and the like. The plasticity of the kneaded mixture desirably lasts for about 1 hour to carry out the kneading, washing, and the like, with tolerance.

For achieving this, a water reducing admixture 16 is added as necessary when adding the hydraulic inorganic solidifying material 15. Examples of the water reducing admixture 16 include a lignin, oxycarbonic acid, naphthalene, melamine, or polycarboxylic water reducing admixture. An inorganic water reducing admixture may be used as the water reducing admixture 16.

Figure 2:
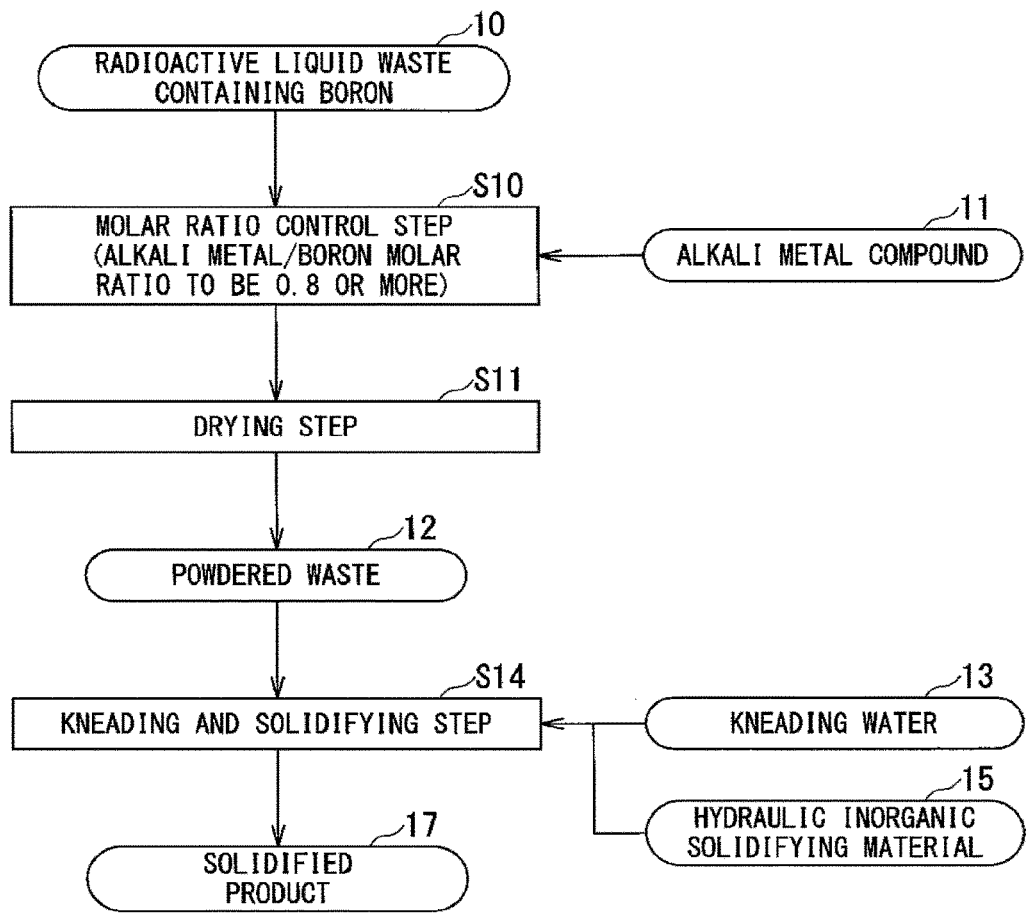
FIG. 2 is a flow chart showing a modified example of the method for processing a radioactive liquid waste according to the first embodiment.

FIG. 2 is a flow chart showing a modified example of the method for processing the radioactive liquid waste 10 according to the first embodiment. In the figure, the same steps as those in the solidification process of the radioactive liquid waste 10 shown in FIG. 1 are denoted by the same symbols, and the description thereof is omitted.

In the present modified example, the solidified product 17 is produced in the kneading and solidifying step S14 without providing the dissolving step S12.

In the kneading and solidifying step S14, the kneading water 13 and the hydraulic inorganic solidifying material 15 are mixed to obtain a slurry. The powdered waste 12 is fed into the slurry, and the slurry is kneaded for solidification to produce the solidified product 17.

The kneading and solidifying step S14 is the same as the common cement solidifying procedure. However, a kneaded mixture is adjusted to the same as those produced in the first embodiment by slowing down the feeding speed of the powdered waste 12 and removing the heat of hydration from the powdered waste 12 using a cooling system.

In the described embodiments above, an alkali metal/boron molar ratio in the radioactive liquid waste is controlled to be 0.8 or more, and this radioactive liquid waste is dried to form a powdered waste. By controlling the alkali metal/boron molar ratio to be 0.8 or more, the radioactive liquid waste is processed to a solidified product with a long-term high strength. Furthermore, by drying the radioactive liquid waste to form the powdered waste, a significant volume reduction of the waste is also achieved because of eliminating water from the radioactive liquid waste.

Second Embodiment

Figure 3:
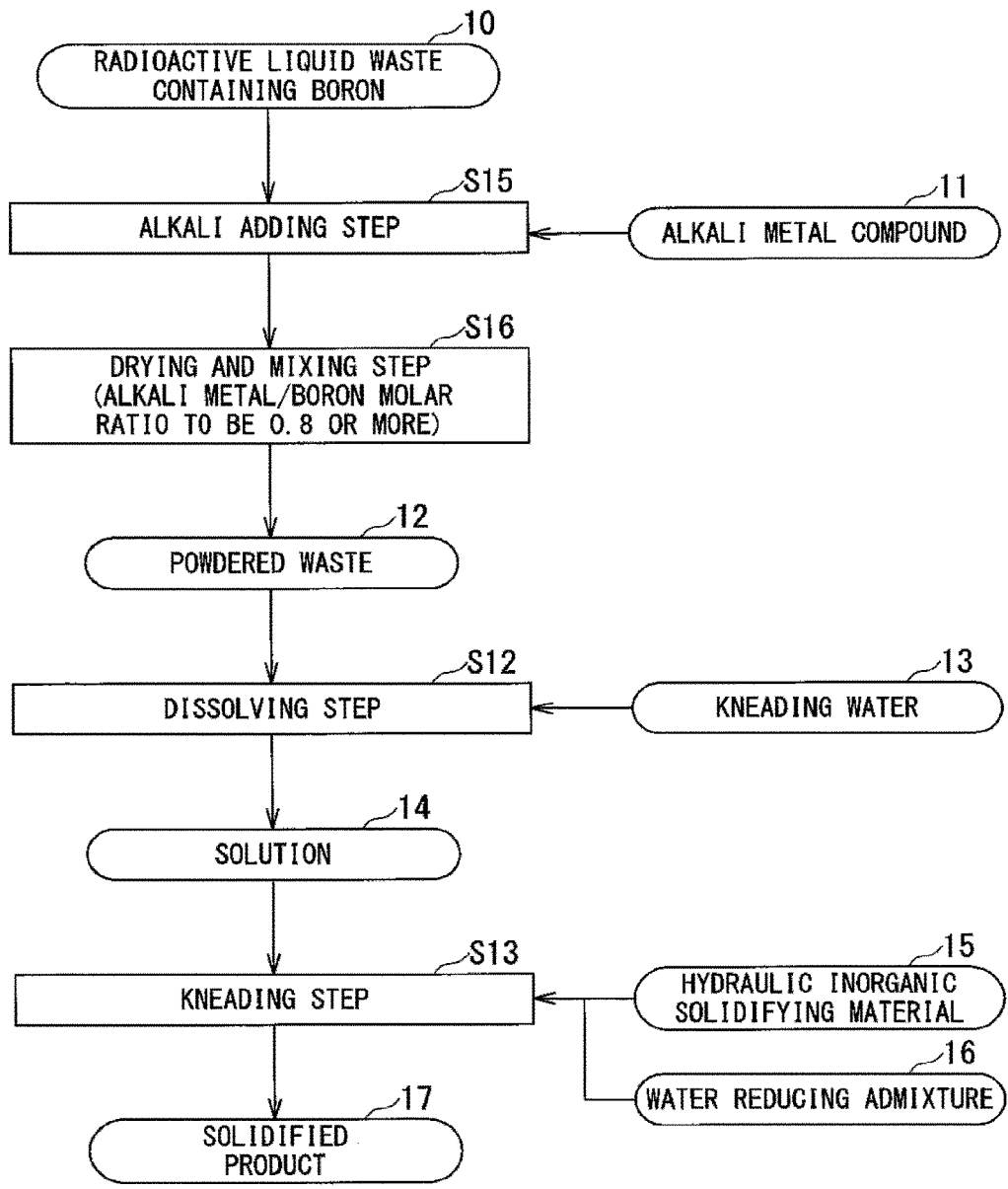
FIG. 3 is a flow chart showing the method for processing a radioactive liquid waste according to a second embodiment.

FIG. 3 is a flow chart showing the method for processing the radioactive liquid waste 10 according to the second embodiment. In the figure, the same steps as those in the solidification process of the radioactive liquid waste 10 shown in FIG. 1 are denoted by the same symbols, and the description thereof is omitted.

The difference of the solidification process of the radioactive liquid waste 10 according to the second embodiment from that of the first embodiment lies where the alkali metal/boron molar ratio is controlled by mixing dry powers 12 having different alkali metal/boron molar ratios, but not controlled by adding different amounts of the alkali metal compound 11 to the radioactive liquid waste 10.

In alkali adding step S15, the alkali metal compound 11 is added to the radioactive liquid waste containing boron 10. Radioactive liquid wastes 10 having different alkali metal/boron molar ratios are produced by controlling amounts of the alkali metal compound 11 to be added. The alkali metal/boron molar ratios of the radioactive liquid wastes 10 produced at this stage may be less than 0.8.

In the drying and mixing step S16, each of the produced radioactive liquid wastes 10 is dried to obtain the powdered waste 12 having different alkali metal/boron molar ratios. The obtained powdered waste 12 are mixed to control the alkali metal/boron molar ratio of the mixed powdered waste 12 to be 0.8 or more.

Thus, the alkali metal/boron molar ratio is easily controlled to be 0.8 or more when the powdered waste 12 produced from the radioactive liquid wastes 10 having different molar ratios are mixed to control the alkali metal/boron molar ratio.

In the described embodiments above, the radioactive liquid wastes having different alkali metal/boron molar ratios are respectively dried to obtain the powdered waste, and an alkali metal/boron molar ratio in the mixed powdered waste is controlled to be 0.8 or more. By controlling the alkali metal/boron molar ratio to be 0.8 or more, the radioactive liquid waste is processed to a solidified product with a long-term high strength. Furthermore, by drying the radioactive liquid waste to form the powdered waste, a significant volume reduction of the waste is also achieved because of eliminating water in the radioactive liquid waste.

EXAMPLES

Examples are illustrated below but the present invention is not intended to be understood by being limited to these Examples. In Examples, sodium hydroxide is selected to be the alkali metal compound 11 to be added to a solution containing boron. The molar ratio of alkali metal (sodium)/boron is abbreviated as "Na/B molar ratio."

Test items, test conditions and test results in Examples and Comparative Examples are shown in Tables 1-5 at the end. In the evaluation column of Tables 1-3, when an uniaxial compression strength of solidified product is 10 MPa or more, this case is evaluated as having a high strength and is described with "A". On the other hand, when an uniaxial compression strength of solidified product is less than 10 MPa, this case is described with "C".

Example 1

In Example 1, a solidification test was carried out in accordance with the treatment process shown in FIG. 1 (Table 1, Example No. 1).

Sodium hydroxide was added to an aqueous solution of about 10 wt % boric acid heated to about 60° C. to control an Na/B molar ratio to be 1, and an aqueous solution of sodium borate was obtained (molar ratio control step S10).

Subsequently, the aqueous sodium borate solution prepared in the molar ratio control step S10 was supplied as a liquid waste in a fixed amount to a wiped film dryer set at a heating temperature of about 160° C. to obtain a powdered waste (drying step S11).

455 g of kneading water was then poured into a 1 L-plastic cup, and 283 g of the powdered waste prepared in the drying step S11 was fed thereinto and stirred for 60 minutes using a desktop stirrer (dissolving step S12).

650 g of a common Portland cement (a water/cement ratio 0.7 (a weight ratio of kneading water to cement)) was added thereto and stirred for about 10 minutes. The obtained kneaded mixture was measured for physical properties and poured into a 50 mm φ×100 mH mold to obtain a solidified product (kneading step S13).

The results reveal that the kneaded mixture prepared from the sodium borate solution with the controlled Na/B molar ratio of 1 had a viscosity of 25 dPa·s suggesting a good plasticity property.

Bleeding was not detected in the obtained solidified product 24 hours later. The obtained solidified product also had a uniaxial compression strength in 97 day material age of 29 MPa, achieving a high strength.

Comparative Example 1

In Comparative Example 1, solidification tests having different Na/B molar ratios in the molar ratio control step S10 were carried out (Table 3, Comparative Examples No. 1 to No. 3). Comparative Example 1 employed the same test conditions as in Example 1 with the exception of different Na/B molar ratios.

Sodium hydroxide was fed to an aqueous solution of about 10 wt % boric acid heated to about 60° C. to control Na/B molar ratios to be 0.25, 0.3 and 0.5 to obtain each of the aqueous solutions of sodium borate.

Subsequently, the prepared aqueous sodium borate solutions with each of the Na/B molar ratios were supplied as a simulated liquid waste in an fixed amount to a wiped film dryer in the same manner as in Example 1 and dried. As a result, the liquid wastes with all Na/B molar ratios had no problems in powder handleability or dryer washability, providing good powdered waste.

Three sets of a 1 L-plastic cup containing 455 g of kneading water were prepared, and 283 g of the obtained powdered waste was respectively fed thereinto and stirred for 60 minutes using a desktop stirrer. The solution, in which the powdered waste prepared with an Na/B molar ratio of 0.5, had an increased viscosity to the extent that the following cement addition was hardly carried out.

650 g of a common Portland cement (a water/cement ratio 0.7 (a weight ratio of kneading water to cement)) was added thereto and stirred for about 10 minutes. The obtained kneaded mixtures were measured for physical properties and poured into a mold to obtain solidified products.

All of the solidified products prepared from the sodium borate solutions with Na/B molar ratios 0.25, 0.3 and 0.5 suffered from cracks caused by swelling at 90 day material age, failing to exhibit a strength. It was verified that a long-term strength of solidified products is not maintained under these Na/B molar ratio conditions.

Example 2

In Example 2, a solidification test was carried out in accordance with the treatment process shown in FIG. 3 (Table 1, Example No. 2).

Sodium hydroxide was fed to an aqueous solution of about 10 wt % boric acid heated to about 60° C. to obtain aqueous sodium borate solutions with controlled Na/B molar ratios of 0.5 and 1, respectively (alkali adding step S15).

Subsequently, each of the aqueous sodium borate solution prepared in the alkali adding step S15 was supplied as a simulated liquid waste in a fixed amount to a wiped film dryer and dried to obtain powdered waste, respectively. The dry powers prepared from the sodium borate solutions with the Na/B molar ratios of 0.5 and 1 were mixed to control an Na/B molar ratio to be 0.8 (drying and mixing step S16).

455 g of kneading water was then poured into a 1 L-plastic cup, and 283 g of the powdered waste prepared in the drying and mixing step S16 was fed thereinto and stirred for 60 minutes using a desktop stirrer (dissolving step S12).

650 g of a common Portland cement (a water/cement ratio 0.7 (a weight ratio of kneading water to cement)) was added thereto and stirred for about 10 minutes. The obtained kneaded mixture was measured for physical properties and poured into a mold to obtain a solidified product (kneading step S13).

As a result, the kneaded mixture had a viscosity of 4 dPa·s, achieving a good kneadability. Bleeding was not detected in the obtained solidified product 24 hours later.

The obtained solidified product also had a uniaxial compression strength in 91 day material age of 27 MPa, achieving a high strength.

Comparative Example 2

In Comparative Example 2, solidification tests having different Na/B molar ratios in the drying and mixing step S16 were carried out (Table 3, Comparative Examples No. 4 and No. 5). Comparative Example 2 employed the same test conditions as in Example 2 with the exception of different Na/B molar ratios.

Sodium hydroxide was fed to an aqueous solution of about 12 wt % boric acid heated to about 60° C. to obtain aqueous sodium borate solutions with controlled Na/B molar ratios of 0.5 and 1, respectively.

Subsequently, each of the aqueous sodium borate solutions prepared in the alkali adding step S15 was supplied as a simulated liquid waste in a fixed amount to a wiped film dryer and dried to obtain powdered waste, respectively. The dry powers prepared from the sodium borate solutions with the Na/B molar ratios of 0.5 and 1 were mixed to control Na/B molar rations to be 0.6 and 0.7.

Two sets of a 1 L-plastic cup containing 455 g of kneading water were prepared, and 283 g of the obtained powdered waste was respectively fed thereinto and stirred for 60 minutes using a desktop stirrer. Common Portland cement was then added thereto and stirred for about 10 minutes. The obtained kneaded mixtures were measured for physical properties and poured into a mold to obtain solidified products.

As a result, kneadability was good and bleeding was not detected in each of the obtained solidified products 24 hours later. However, the solidified products in 91 day material age failed to exhibit a strength. It was verified that a long-term high strength of solidified products is not maintained under these Na/B molar ratio conditions.

Example 3

In Example 3, solidification tests having different amounts of kneading water and cement blended were carried out (Tables 1 and 2, Examples No. 3 to No. 8). Example 3 employed the same test conditions as in Example 1 with the exception of different amounts of kneading water and cement blended.

Sodium hydroxide was fed to an aqueous solution of about 10 wt % boric acid heated to about 60° C. to control an Na/B molar ratio to be 1 to obtain an aqueous solution of sodium borate. The aqueous solution was then subjected to a wiped film dryer to obtain a powdered waste.

With a fixed amount of the powdered waste being 283 g, kneading water and a cement were combined under the following three conditions (Examples No. 3 to No. 5): water 388 g and the cement 863 g (water/cement ratio: about 0.45), water 417 g and the cement 772 g (water/cement ratio: about 0.54), and water 501 g and the cement 501 g (water/cement ratio: 1). Each of the kneaded mixtures was poured into a mold to obtain solidified products.

As a result, the uniaxial compression strengths in about 90 day material age of the obtained solidified products were all more than 10 MPa, achieving a high strength.

In Example No. 6, with an amount of the powdered waste being 564 g, kneading water and a cement were combined under the condition: water 698 g and the cement 821 g (water/cement ratio: about 0.85). The powdered waste per unit volume of this condition increase more than that of Examples No. 3 to No. 5. The kneaded mixture was poured into a mold to obtain solidified products.

As a result, the kneaded mixture had a viscosity of below 3 dPa·s, achieving a good kneadability. Bleeding was not detected in the obtained solidified product 24 hours later. The obtained solidified product also had a uniaxial compression strength in 91 day material age of 25 MPa, achieving a high strength.

In Example No. 7, with an amount of the powdered waste being 414 g, kneading water and a cement were combined under the condition (Example No. 7): water 489 g and the cement 699 g (water/cement ratio: 0.7). The powdered waste per unit volume of this condition is almost same as the condition of Example No. 6. The kneaded mixture was poured into a mold to obtain solidified products.

As a result, bleeding was not detected in the obtained solidified product 24 hours later. The obtained solidified product also had a uniaxial compression strength in 91 day material age of 61 MPa, achieving a high strength.

In Example No. 8, with an amount of the powdered waste being 414 g, kneading water and a cement were combined under the condition: water 593 g and the cement 593 g (water/cement ratio: 1). The powdered waste per unit volume of this condition is almost same as the condition of Example No. 6. The kneaded mixture was poured into a mold to obtain solidified products.

As a result, the kneaded mixture had a viscosity of below 3 dPa·s, achieving a good kneadability. The obtained solidified product also had a uniaxial compression strength in 91 day material age of 17 MPa, achieving a high strength.

Example 4

In Example 4, a solidification test was carried out in accordance with the treatment process shown in FIG. 2 (Table 2, Example No. 9).

Sodium hydroxide was added to an aqueous solution of about 12 wt % boric acid heated to about 60° C. to control an Na/B molar ratio to be 1 to obtain an aqueous solution of sodium borate (molar ratio control step S10).

Subsequently, the aqueous sodium borate solution prepared in the molar ratio control step S10 was supplied as a simulated liquid waste in a fixed amount to a wiped film dryer set at a heating temperature of about 160° C. to obtain a powdered waste (drying step S11).

The cement and kneading water were kneaded for 10 minutes and subsequently the powdered waste was fed gradually in small portions and kneaded for 10 minutes (kneading and solidifying step S14). The obtained kneaded mixture was measured for physical properties and poured into a mold to obtain a solidified product. The blending condition was kneading water 417 g, the cement 772 g, and the powdered waste 283 g.

As a result, the kneaded mixture had a viscosity of 4 dPa·s, achieving a good kneadability. The obtained solidified product had a bleeding rate of 0 vol % 24 hours later and a uniaxial compression strength in 91 day material age of about 39 MPa, achieving a high strength.

Example 5

In Example 5, a solidification test was carried out using a reagent sodium metaborate tetrahydrate (Na/B molar ratio: 1) to be an imitation of the powdered waste (Table 2, Example No. 10). Other test conditions were the same as Example 1.

As a result, the kneaded mixture had a viscosity of 3 dPa·s or less, achieving a good kneadability. The obtained kneaded mixture also had a uniaxial compression strength in 91 day material age of about 25 MPa. Evidently, the powdered waste unsubjected to heat treatment using a dryer was revealed to achieve a high strength.

Example 6

In Example 6, the drying temperatures in the drying step S11 were evaluated (Table 4, Examples No. 11 to No. 14). In this example, the drying treatments were carried out using a sodium borate solution with the controlled Na/B molar ratio of 1 at different drying temperatures from 145° C. to 175° C. in a wiped film dryer. The conditions of dried products produced at each temperature were examined by visual contact. The maximum electric power consumption for operating the wiped film dryer for 1 hour was measured to monitor the operation condition of the dryer. Example 6 employed the same test conditions as in Example 1 with the exception of different temperatures.

The determination value for evaluating the operation stability of the dryer was judged whether the maximum electric power consumption was 33% (⅓) or less of the rated output.

In the powder condition column of Tables 4 and 5, when dried product is uniform powdered waste, this case is described with "A". When a lot of solid materials such as lamps are discharged, this case is described with "B". When the sodium borate solution does not become powdered waste with slurry being discharged, this case is described with "C". Also, in the evaluation column of Tables 4 and 5, when dried product become uniform powdered waste and the maximum electric power consumption is 33% or less of the rated output, this case is described with "A". The other cases are described with "C".

Consequently, a slurry was not discharged at any of the drying temperatures 145° C., 150° C., 160° C., or 175° C. and uniform powdered waste were obtained. In addition, the maximum electric power consumption was less than the determination value, which revealed the stable operation of the dryer.

Example 7

In Example 7, the drying temperatures were evaluated with an Na/B molar ratio as the parameter (Table 4, No. 12, No. 15, and No. 16). In this example, the drying treatments were carried out using sodium borate solutions with the controlled Na/B molar ratios of 1, 0.92, and 1.15 at a drying temperature of 150° C. in a wiped film dryer. The conditions of dried products at each of the Na/B molar ratios were examined. As in Example 6, the maximum electric power consumption for operating the wiped film dryer for 1 hour was measured to monitor the operation condition of the dryer.

Consequently, a slurry was not discharged at any of the Na/B molar ratios: 0.92, 1.0, or 1.15, which controlled to obtain uniform powdered waste. In addition, the maximum electric power consumption was less than the determination value, which revealed the stable operation of the dryer.

Comparative Example 3

In Comparative Example 3, the drying treatment was carried out using an aqueous sodium borate solution with the controlled Na/B molar ratio of 1 at a drying temperature of 140° C. in a wiped film dryer as in Examples 6 and 7 (Table 5, No. 6). As a result, insufficient drying at 140° C. failed to produce a powdered waste and slurry was discharged.

In Comparative Example 3, the drying treatments were further carried out using aqueous sodium borate solutions with the controlled Na/B molar ratios of 0.85 and 0.9 as simulated liquid wastes at a drying temperature of 150° C. (Table 5, No. 7 and No. 8).

As a result, many dried products with large diameters were produced and granular dried products were not obtained. Thus, the retention of the dried products inside the dryer was significant and consequently a motor load of the dryer was increased to cause a failure in stable operation of the dryer.

The conditions and measurement results of Examples Nos. 1 to 5 as described above are shown in Table 1.

TABLE 1

|  | Test item |  | Example No. | | | | |
| --- | --- | --- | --- | --- | --- | --- | --- |
|  |  |  | No. 1 | No. 2 | No. 3 | No. 4 | No. 5 |
|  |  |  | Na/B Molar ratio | | Water/cement ratio | | |
| Condition | Na/B Molar ratio |  | 1 | 0.8 | 1 | 1 | 1 |
|  | Water/cement proportion | (Water/cement ratio) | 0.7 | 0.7 | 0.45 | 0.54 | 1 |
| Result | Uniaxial compression strength | (Approx. 90 day material age, MPa) | 29 | 27 | 40 | 37 | 16 |
|  | Evaluation |  | A | A | A | A | A |

The conditions and measurement results of Examples Nos. 6 to 10 as described above are shown in Table 2.

TABLE 2

|  | Test item |  | Example No. | | | | |
| --- | --- | --- | --- | --- | --- | --- | --- |
|  |  |  | No. 6 | No. 7 | No. 8 | No. 9 | No. 10 |
|  |  |  | Water/cement ratio | | | Knead method | powdered waste |
| Condition | Na/B Molar ratio |  | 1 | 1 | 1 | 1 | 1 |
|  | Water/cement proportion | (Water/cement ratio) | 0.85 | 0.7 | 1 | 0.54 | 0.7 |
| Result | Uniaxial compression strength | (Approx. 90 day material age, MPa) | 25 | 61 | 17 | 39 | 25 |
|  | Evaluation |  | A | A | A | A | A |

The conditions and measurement results of Comparative Examples Nos. 1 to 5 as described above are shown in Table 3.

TABLE 3

| | Test item | | Comparative Example No. | | | | |
|---|---|---|---|---|---|---|---|
| | | | No. 1 | No. 2 | No. 3 | No. 4 | No. 5 |
| | | | Na/B Molar ratio | | | | |
| Condition | Na/B Molar ratio | | 0.25 | 0.3 | 0.5 | 0.6 | 0.7 |
| | Water/cement proportion | (Water/cement ratio) | 0.7 | 0.7 | 0.7 | 0.7 | 0.7 |
| Result | Uniaxial compression strength | (Approx. 90 day material age, MPa) | 0 | 0 | 0 | 0 | 0 |
| | Evaluation | | C | C | C | C | C |

The conditions and measurement results of Example Nos. 11 to 16 as described above are shown in Table 4.

TABLE 4

| | | | Example No. | | | | | |
|---|---|---|---|---|---|---|---|---|
| | | | No. 11 | No. 12 | No. 13 | No. 14 | No. 15 | No. 16 |
| | Test item | | Na/B Molar ratio | | | | | |
| Condition | Na/B Molar ratio | | 1 | 1 | 1 | 1 | 0.92 | 1.15 |
| | Drying temperature | [° C.] | 145 | 150 | 160 | 175 | 150 | 150 |
| Result | Power consumption (max value) to rated power | [%] | 20 | 19 | 20 | 22 | 24 | 26 |
| | Powder condition(visual) | — | A | A | A | A | A | A |
| | Evaluation | | A | A | A | A | A | A |

The conditions and measurement results of Comparative Examples Nos. 6 to 8 as described above are shown in Table 5.

TABLE 5

| Comparative Example No. | | | No. 6 | No. 7 | No. 8 |
|---|---|---|---|---|---|
| | Test item | | Na/B Molar ratio | | |
| Condition | Na/B Molar ratio | | 1 | 0.85 | 0.9 |
| | Temperature | [° C.] | 140 | 150 | 150 |
| Result | Power consumption (max value) to rated power | [%] | — | 40 | 83 |
| | Powder condition (visual) | — | C | B | B |
| | Evaluation | | C | C | C |

The results of Examples and Comparative Examples verified that the solidified products obtained with the cement addition, when an alkali metal/boron molar ratio is controlled to be 0.8 or more, have a long-term high strength. The results of Examples 2 and 5 further revealed that the liquid waste is processed to a solidified product with a long-term high strength when an alkali metal/boron molar ratio is controlled to be 0.8 or more at the stage of the powdered waste, i.e., at the stage before feeding kneading water and a cement.

The results of Examples 6, 7 and Comparative Example 3 showed that the liquid waste is desirably dried at more than 140° C. in the drying step S11. The results further revealed that the radioactive liquid waste is assuredly powdered when processed in an Na/B molar ratio of 0.9 or a higher value.

According to the method for processing the radioactive liquid waste as described in each of the above embodiments, when an alkali metal or an alkali metal compound is added to a radioactive liquid waste containing boron to control an alkali metal/boron molar ratio to be 0.8 or more, the liquid waste is processed to a solidified product with a long-term high strength and a significant volume reduction of the waste and the stability of treatment process are also achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for processing a radioactive liquid waste comprising:
    controlling a molar ratio control of by adding an alkali metal or an alkali metal compound to a radioactive liquid waste containing boron to control an alkali metal/boron molar ratio in the radioactive liquid waste to be 0.8 or more;
    drying the radioactive liquid waste having the controlled molar-ratio using a wiped film dryer to form a powdered waste;
    dissolving the powered waste by mixing the powdered waste with kneading water to prepare a solution;
    adding a hydraulic inorganic solidifying material to the solution in which the powdered waste has been dissolved; and
    kneading the hydraulic inorganic solidifying material and the solution for solidification.

2. The method for processing a radioactive liquid waste according to claim 1, wherein the alkali metal added to the radioactive liquid waste is lithium, sodium, potassium, cesium, rubidium, or a combination thereof.

3. The method for processing a radioactive liquid waste according to claim 1, wherein the alkali metal compound added to the radioactive liquid waste is lithium hydroxide, sodium hydroxide, potassium hydroxide, cesium hydroxide, rubidium hydroxide, lithium oxide, sodium oxide, potassium oxide, cesium oxide, rubidium oxide, sodium aluminate, lithium aluminate, potassium aluminate, cesium aluminate, rubidium aluminate, or a combination thereof.

4. The method for processing a radioactive liquid waste according to claim 1, wherein the hydraulic inorganic solidifying material is a Portland cement, caustic lime, blast-furnace slug cement, fly ash, siliceous material, pozzolanic material, alumina cement, or phosphoric acid cement, or a combination thereof.

5. The method for processing a radioactive liquid waste according to claim 1, wherein an alkali metal/boron molar ratio in the powdered waste after the drying is 0.8 or more.

6. The method for processing a radioactive liquid waste according to claim 1, wherein a temperature for drying the radioactive liquid waste is more than 140° C. in the drying.

7. A method for processing a radioactive liquid waste comprising:
- adding of adding an alkali metal or an alkali metal compound to a radioactive liquid waste containing boron to produce radioactive liquid wastes having different alkali metal/boron molar ratios;
- mixing of mixing powdered wastes prepared by drying each of the produced radioactive liquid wastes using a wiped film dryer to control an alkali metal/boron molar ratio in the mixed powdered wastes to be 0.8 or more;
- dissolving the powered waste by mixing the powdered waste having the controlled molar-ratio with kneading water to prepare a solution;
- adding a hydraulic inorganic solidifying material to the solution in which the powdered waste has been dissolved; and
- kneading the solution and the hydraulic inorganic solidifying material for solidification.

* * * * *